US012606200B2

(12) United States Patent
Zhang et al.

(10) Patent No.: US 12,606,200 B2
(45) Date of Patent: Apr. 21, 2026

(54) GENERATIVE ARTIFICIAL INTELLIGENCE TO PRE-TRAIN AND FINE-TUNE MODELS FOR MULTIPLE AUTONOMOUS VEHICLE FUTURE TRAJECTORIES

(71) Applicant: GM CRUISE HOLDINGS LLC, San Francisco, CA (US)

(72) Inventors: Xiaohan Zhang, Kensington, CA (US); Xin Huang, Santa Clara, CA (US); Yuning Chai, San Mateo, CA (US); Zisu Dong, Oakland, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 197 days.

(21) Appl. No.: 18/403,231

(22) Filed: Jan. 3, 2024

(65) Prior Publication Data

US 2025/0214606 A1 Jul. 3, 2025

(51) Int. Cl.
*B60W 60/00* (2020.01)
*G06N 3/0475* (2023.01)

(52) U.S. Cl.
CPC ......... *B60W 60/001* (2020.02); *G06N 3/0475* (2023.01)

(58) Field of Classification Search
CPC ... B60W 60/001; G06N 3/0475; G06N 3/045; G06N 3/0455; G06N 3/094
See application file for complete search history.

(56) References Cited

U.S. PATENT DOCUMENTS 12,039,016 B2 * 7/2024 Oh ........................... G06N 7/01
12,136,185 B2 * 11/2024 Kuen ................... G06V 10/751
(Continued)

FOREIGN PATENT DOCUMENTS

CN 110659576 A * 1/2020 ............... G06N 3/08
CN 113191489 A * 7/2021 ............. G06N 3/045
CN 117011626 A * 11/2023 ........... G06V 10/774

OTHER PUBLICATIONS

"Huang, Yu; Chan, Yue; Li, Zhu; Applications of Large Scale Foundation Models for Autonomous Diving; Nov. 20, 2023; arXiv 2311.12144" (Year: 2023).*
(Continued)

*Primary Examiner* — Ramya P Burgess
*Assistant Examiner* — Christopher R Cardimino
(74) *Attorney, Agent, or Firm* — CANTOR COLBURN LLP

(57) ABSTRACT

Disclosed are embodiments for facilitating generative artificial intelligence (AI) to pre-train and fine-tune models for multiple autonomous vehicle (AV) trajectories generation. In some aspects, an embodiment includes training a teacher generative AI model on a first set of training data; providing a student generative AI model with at least one distillation of the teacher generative AI model, the at least one distillation comprising transformer weights, embeddings, or predictions labels of the teacher generative AI model; training the student generative AI model that is initialized with the at least one distillation of the teacher generative AI model, wherein the student generative AI model is trained using a second set of training data that is smaller than the first set of training data; and deploying the student generative AI model to a resource-constrained environment.

14 Claims, 12 Drawing Sheets

400

Train a teacher generative AI model on a first set of training data having a dataset input format
410

Providing a student generative AI model with at least one distillation of the teacher generative AI model, the at least one distillation comprising transformer weights, embeddings, or prediction labels of the teacher generative AI model, wherein the student generative AI model is configured with the dataset input format of the teacher generative AI model
420

Train the student generative AI model initialized with the distillation of the teacher generative AI model, where the student generative AI model is trained using a second set of training data having the dataset input format, the second set of training data that is smaller than the first set of training data
430

Deploy the student generative AI model to a resource-constrained environment
440

(56) References Cited

U.S. PATENT DOCUMENTS

| | | | | |
|---|---|---|---|---|
| 2022/0366263 A1* | 11/2022 | Ji | .......................... | G06N 3/0895 |
| 2022/0374686 A1* | 11/2022 | Hasenclever | ........ | G06N 3/0455 |
| 2023/0078218 A1* | 3/2023 | Wang | ..................... | G06N 3/098 |
| | | | | 706/12 |
| 2023/0162005 A1* | 5/2023 | Cheng | ................ | G06F 16/9035 |
| | | | | 706/15 |
| 2023/0196117 A1* | 6/2023 | Du | ........................ | G06F 18/214 |
| | | | | 382/155 |
| 2024/0394514 A1* | 11/2024 | Hnewa | ................... | G06N 3/045 |
| 2025/0131321 A1* | 4/2025 | Yu | .......................... | G06N 20/00 |
| 2025/0153735 A1* | 5/2025 | Li | .......................... | G06V 20/56 |
| 2025/0200057 A1* | 6/2025 | Pakazad | .............. | G06N 3/0442 |
| 2025/0200979 A1* | 6/2025 | Yan | ........................ | G06V 10/82 |

OTHER PUBLICATIONS

"Lucny, Andrej; Towards one-shot Learning via Attention; 2022; ITAT" (Year: 2022).*
"Li, Hengduo; et. al.; Rethinking Pseudo Labels for Semi-supervised Object Detection; 2022; The Thirty-Sixth AAAI Conference on Artificial Intelligence" (Year: 2022).*
"Ghimire, Deepak; et. al.; A Survey on Efficient Convolutional Neural Networks and Hardware Acceleration; Mar. 18, 2022; Electronics 2022, 11, 945" (Year: 2022).*

* cited by examiner

300

<u>400</u>

Train a teacher generative AI model on a first set of training data having a dataset input format <u>410</u>

Providing a student generative AI model with at least one distillation of the teacher generative AI model, the at least one distillation comprising transformer weights, embeddings, or prediction labels of the teacher generative AI model, wherein the student generative AI model is configured with the dataset input format of the teacher generative AI model <u>420</u>

Train the student generative AI model initialized with the distillation of the teacher generative AI model, where the student generative AI model is trained using a second set of training data having the dataset input format, the second set of training data that is smaller than the first set of training data <u>430</u>

Deploy the student generative AI model to a resource-constrained environment

Figure 5A:
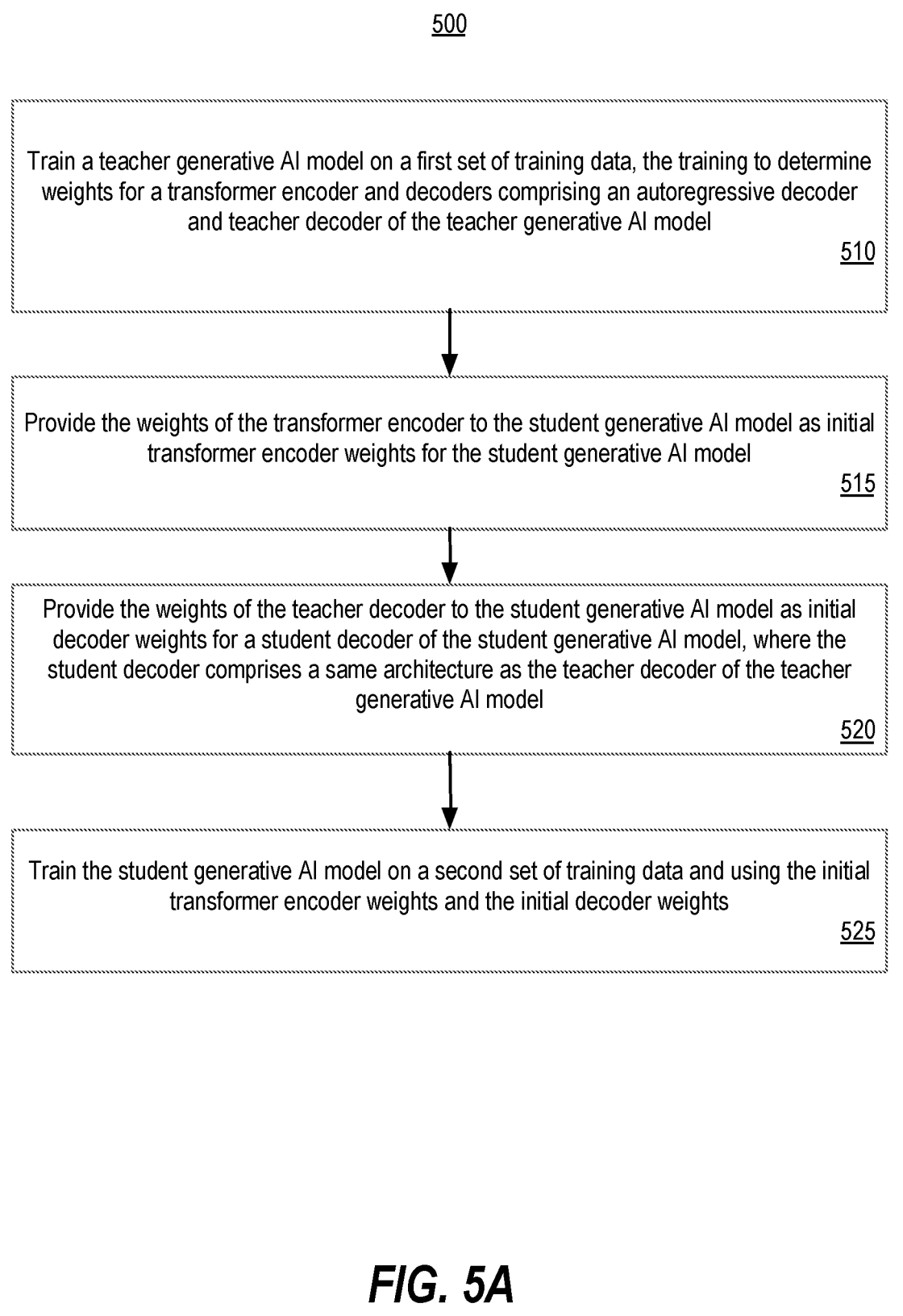

Train a teacher generative AI model on a first set of training data, the training to determine weights for a transformer encoder and decoders comprising an autoregressive decoder and teacher decoder of the teacher generative AI model

510

Provide the weights of the transformer encoder to the student generative AI model as initial transformer encoder weights for the student generative AI model

515

Provide the weights of the teacher decoder to the student generative AI model as initial decoder weights for a student decoder of the student generative AI model, where the student decoder comprises a same architecture as the teacher decoder of the teacher generative AI model

520

Train the student generative AI model on a second set of training data and using the initial transformer encoder weights and the initial decoder weights

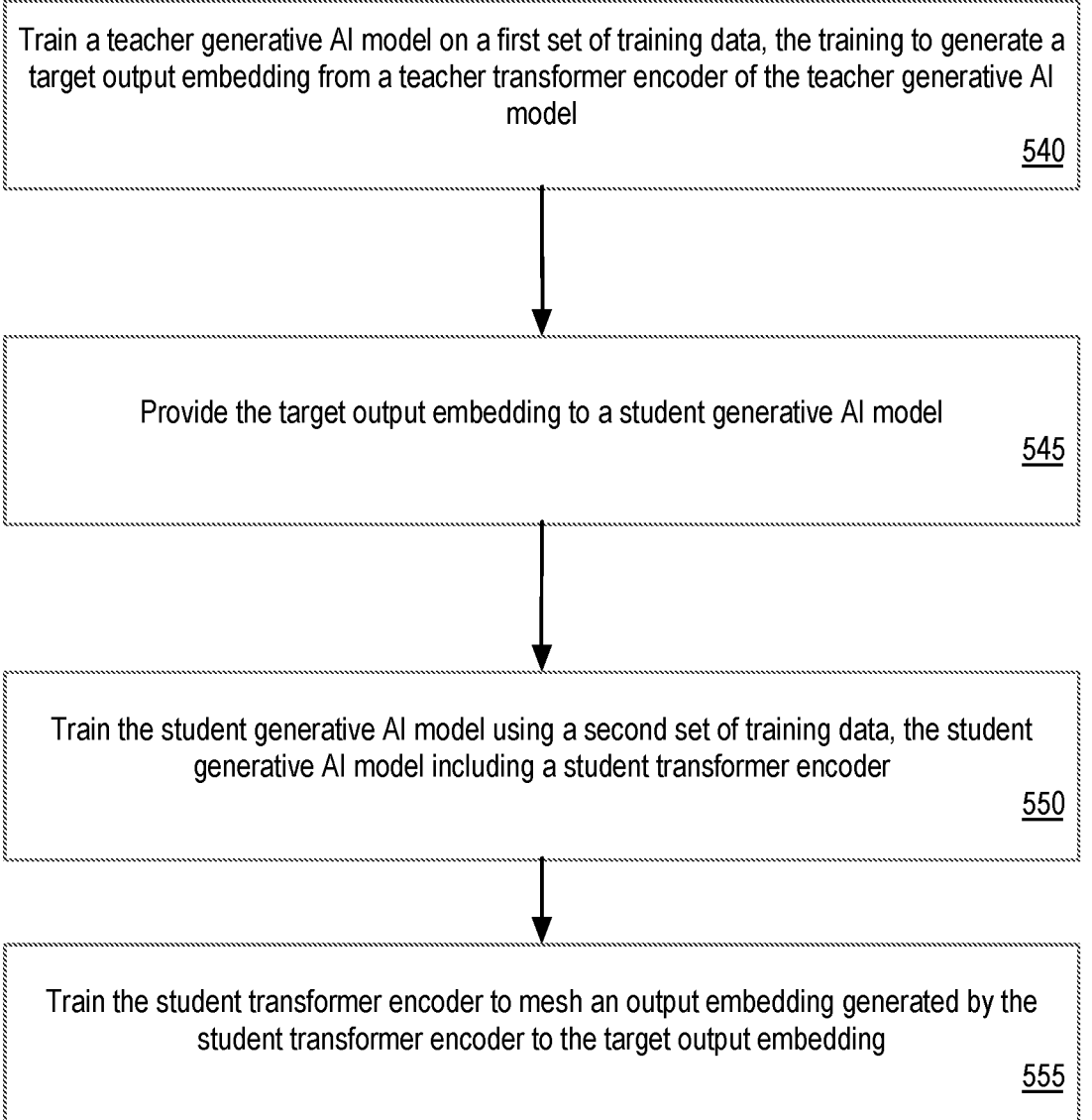

Train a teacher generative AI model on a first set of training data, the training to generate a target output embedding from a teacher transformer encoder of the teacher generative AI model <u>540</u>

Provide the target output embedding to a student generative AI model

<u>545</u>

Train the student generative AI model using a second set of training data, the student generative AI model including a student transformer encoder <u>550</u>

Train the student transformer encoder to mesh an output embedding generated by the student transformer encoder to the target output embedding <u>555</u>

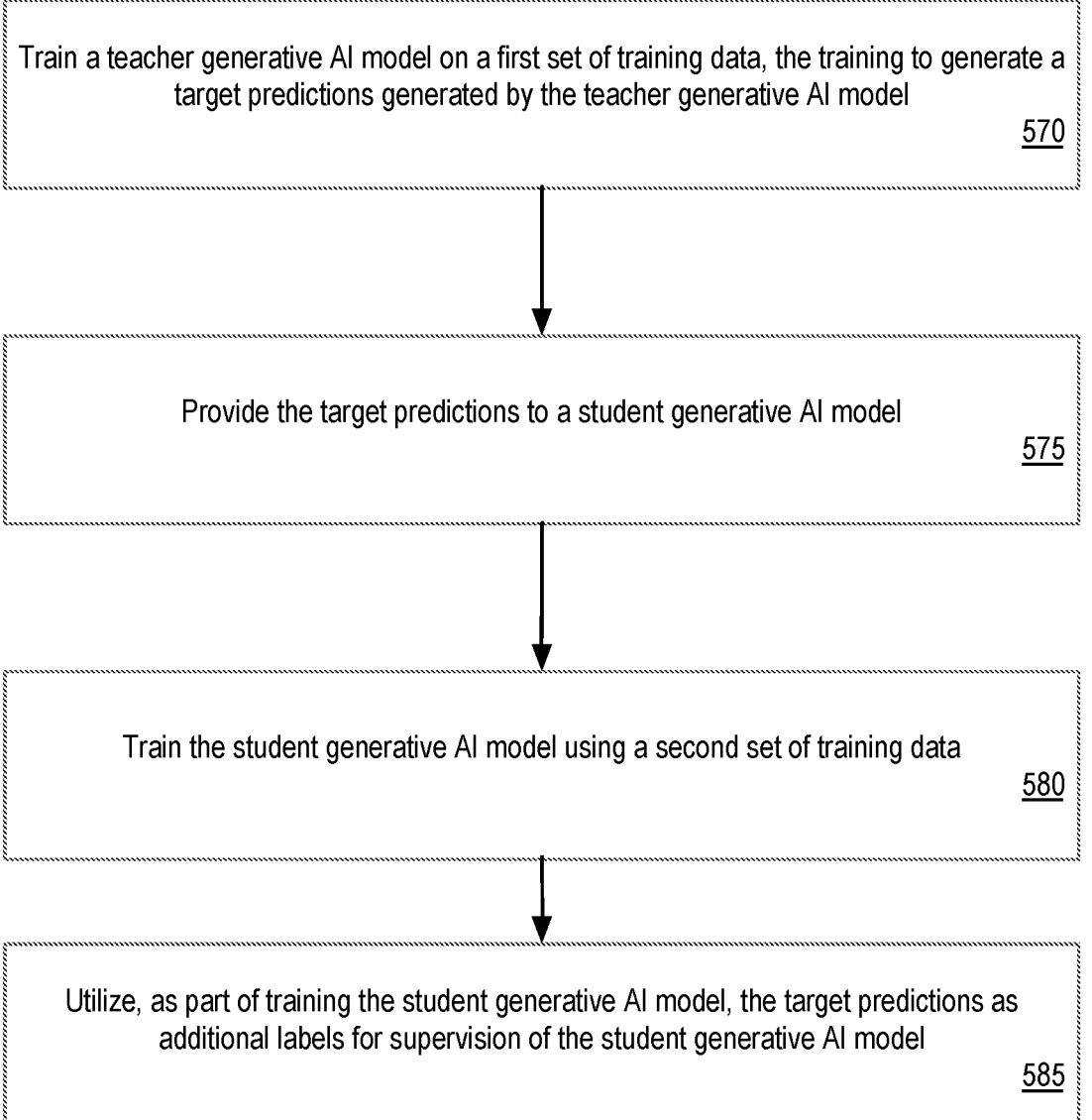

Train a teacher generative AI model on a first set of training data, the training to generate a target predictions generated by the teacher generative AI model

570

Provide the target predictions to a student generative AI model

575

Train the student generative AI model using a second set of training data

580

Utilize, as part of training the student generative AI model, the target predictions as additional labels for supervision of the student generative AI model

GENERATIVE ARTIFICIAL INTELLIGENCE TO PRE-TRAIN AND FINE-TUNE MODELS FOR MULTIPLE AUTONOMOUS VEHICLE FUTURE TRAJECTORIES

BACKGROUND

1. Technical Field

The disclosure generally relates to the field of processing systems and, more specifically, to generative artificial intelligence to pre-train and fine-tune models for multiple autonomous vehicle trajectories generation.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 4 illustrates an example method for generative AI to pre-train and fine-tune models for multiple AV trajectories generation, in accordance with embodiments herein;

FIG. 5A illustrates an example method implementing distilling transformer weights as part of utilizing generative AI to pre-train and fine-tune models for multiple AV trajectories generation, in accordance with embodiments herein;

FIG. 5B illustrates an example method implementing distilling embeddings as part of utilizing generative AI to pre-train and fine-tune models for multiple AV trajectories generation, in accordance with embodiments herein;

FIG. 5C illustrates an example method implementing distilling labels as part of utilizing generative AI to pre-train and fine-tune models for multiple AV trajectories generation, in accordance with embodiments herein;

DETAILED DESCRIPTION

Figure 1:
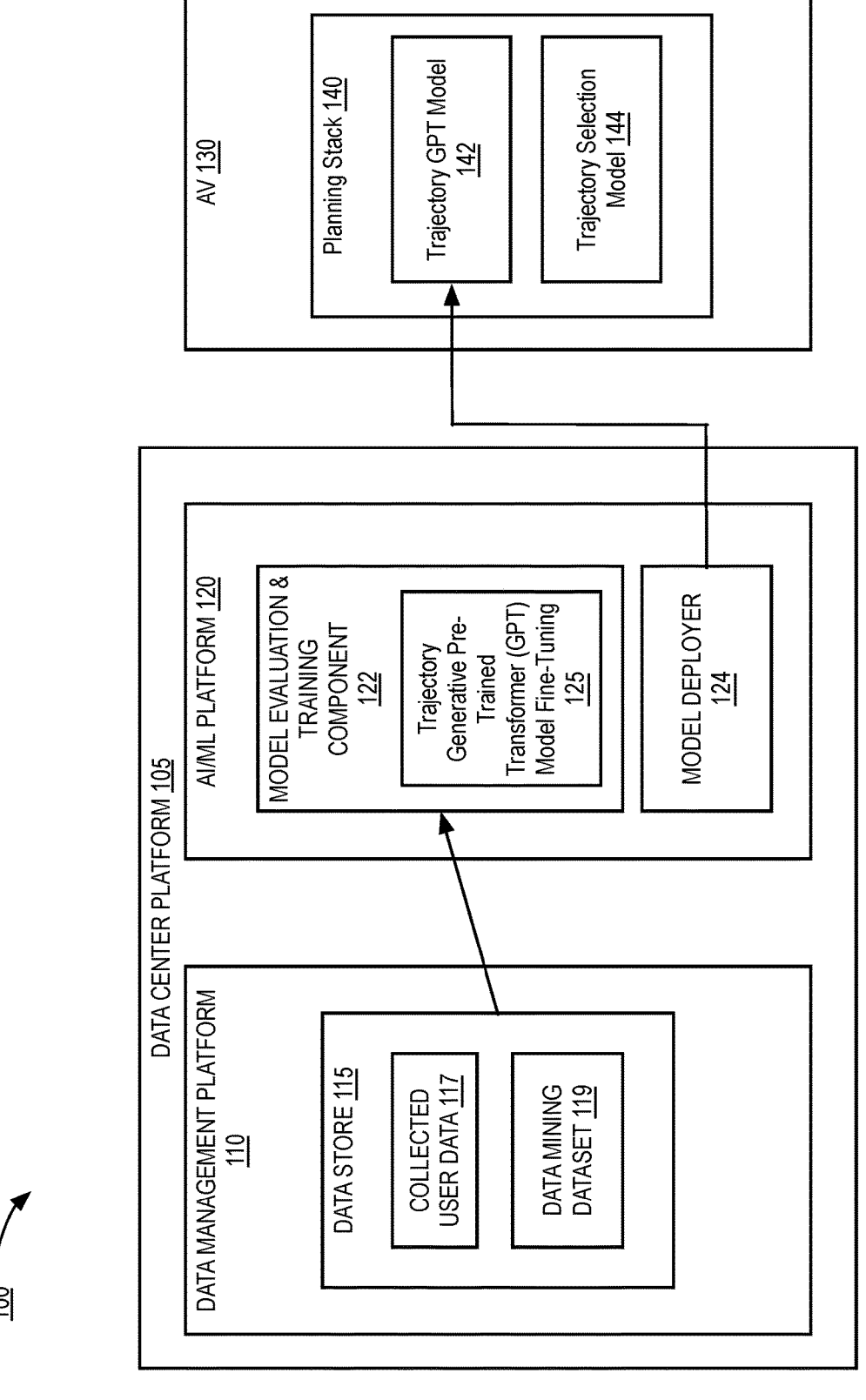
FIG. 1 a block diagram illustrating an example system for generative artificial intelligence (AI) to pre-train and fine-tune model for multiple autonomous vehicle (AV) trajectories generation, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can utilize one or more trained machine learning (ML)-based models that autonomously control and/or operate the vehicle. The trained model(s) can utilize the data and measurements captured by the sensors of the AV to identify, classify, and/or track objects (e.g., vehicles, people, stationary objects, structures, animals, etc.) within the AV's environment. The model(s) utilized by the AV may be trained using any of various suitable types of learning, such as deep learning (also known as deep structured learning). Deep learning is part of a broader family of machine learning methods based on artificial neural networks with representation learning. The learning can be supervised, semi-supervised, or unsupervised, and may be trained using real-world image data and/or image data generated in a simulated environment that have been labeled according to "correct" outputs of one or more perception functions (e.g., segmentation, classification, and/or tracking) of the AV.

As part of autonomously controlling and operating the vehicle, AVs can utilize one or more trajectory planning models, including trajectory generation models, for generation of sets of candidate trajectories that downstream systems of the AV may select from for purposes of implementing on-road navigation behavior of the AV. Trajectory generation models are naturally generative models, having the goal to generate as many valid, feasible trajectories as possible. The trajectory generation models aim to model the joint distribution of the observable variables and target variables. This is in comparison to a discriminative model, such as a trajectory selection model, where the conditional probability of the target variable is modeled given the observable variables.

However, continued development of trajectory generation models aim to simplify architecture of the trajectory generation models, reduce latency of the trajectory generation models, reduce model size of the trajectory generation models, and provide for less model tuning parameters and steps. One approach to achieve these noted aims is to implement the trajectory generation model as a generative pre-trained transformer (GPT)-based model. GPT models are a type of large language model (LLM) and provide a framework for generative AI. As such, this style of model fits well with trajectory generation models, as the state of the AV can be modeled as language tokens, and a generated trajectory can be seen as a generated sequence of words. However, some generative AI models can utilize more processing resources and memory space than is available during deployment on an AV.

Embodiments herein provide for generative AI to pre-train and fine-tune models for multiple AV trajectories generation. In one embodiment, a GPT-based trajectory generation model is provided for generating trajectories for AVs. In embodiments herein, the GPT-based trajectory generation model is considered a student model that can be fine-tuned using a teacher generative AI model that is pre-trained using a higher volume of data than the smaller data set used to train the student GPT-based trajectory generation model. In some embodiments, the student and teacher models may share a same input format and similar model architecture, but be trained using different size data sets. Some portions of the architecture of the student model may differ from the teacher model in order to enable a smaller model size of the student model for deployment on an AV, for example.

The generative AI to pre-train and fine-tune model for multiple AV trajectories generation of embodiments herein enables deployment of a reduced model size generative AI model to a resource-limited environment, while taking advantage of the pre-trained weights and parameters of a larger model size generative AI model that is trained using a higher volume data set. This fine-tuning and bootstrapping of the smaller generative AI model provides for improved performance of the smaller generative AI model.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discusses embodiments as implemented in an automotive environment, but one skilled in the art will appreciate that embodiments may be implemented in a variety of different environments and use cases. Further details of the generative AI to pre-train and fine-tune models for multiple AV trajectories generation of embodiments herein are further described below with respect to FIGS. 1-8.

FIG. 1 is a block diagram illustrating an example system 100 for generative AI to pre-train and fine-tune models for multiple AV trajectories generation, in accordance with embodiments herein. In one embodiment, system 100 implements a data center platform 105 communicably coupled to an AV 130 for providing the data mining on an edge platform using repurposed neural network models in autonomous systems, as described further herein. The data center platform 105 of FIG. 1 can be, for example, part of a data center that is cloud-based or otherwise. In other examples, the AV 130 can be part of an AV or a human-operated vehicle having an advanced driver assistance system (ADAS) that can utilize various sensors including radar sensors.

In one embodiment, system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The system 100 may be part of a platform for managing a fleet of AVs and AV-related services. The platform can include the data center platform 105, which can send and receive various signals to and from an AV 130. These signals can include sensor data captured by the sensor systems of the AV 130, roadside assistance requests, software updates, ridesharing pick-up and drop-off instructions, and so forth. In some examples, the data center platform 105 may also support a ridesharing service, a delivery service, a remote/roadside assistance service, street services (e.g., street mapping, street patrol, street cleaning, street metering, parking reservation, etc.), and the like. In some embodiments, the system 100 may be implemented in the AV itself or may be implemented in a server computing device.

In this example, the system 100 includes a data center platform 105 hosting one or more of a data management platform 110 and an Artificial Intelligence/Machine Learning (AI/ML) platform 120, among other systems, that are communicably coupled to an AV 130.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores collected user data 117 collected, for example, from the user (e.g., as part of setting up a user profile) and/or from operation of one or more AVs. In some embodiments, data store 115 may also include a data mining dataset 119 that stores data that is mined for use in training and/or evaluation of ML models.

The AI/ML platform 120 can provide an infrastructure for training and evaluating machine learning algorithms for operating the AV, and other platforms and systems. In one embodiment, the AI/ML platform 120 of system 100 may include a model evaluation and training component 122, and/or a model deployer 124. Using the model evaluation and training component 122, and/or the model deployer 124, data scientists can prepare data sets from the data management platform 110; select, design, and train machine learning models 142, 144; evaluate, refine, and deploy the models 142, 144; maintain, monitor, and retrain the models 142, 144; and so on.

As part of autonomously controlling and operating the vehicle, an AV 130 can utilize a planning stack 140 to determine how to maneuver or operate the AV 130 safely and efficiently in its environment. As part of its functions, the planning stack 140 may generate and select trajectories for purposes of implementing on-road navigation behavior of the AV 130. The planning stack 140 may include one or more ML-based models trained and deployed from AI/ML platform 120 using model evaluation and training component 122 and model deployer 124. The ML-based models deployed to planning stack 140 can include, but are not limited to, a trajectory generation model, such as trajectory GPT model 142, and a trajectory selection model 144.

The trajectory generation model, such as trajectory GPT model 142, can determine multiple sets of one or more trajectories that the AV 130 can perform (e.g., go straight at a specified speed or rate of acceleration, including maintaining the same speed or decelerating; turn on the left blinker, decelerate if the AV 130 is above a threshold range for turning, and turn left; turn on the right blinker, accelerate if the AV 130 is stopped or below the threshold range for turning, and turn right; decelerate until completely stopped and reverse; etc.). The trajectory selection model 144 can receive the generated set of trajectories from the trajectory generation model and select a trajectory to meet changing road conditions and events.

As part of the autonomous control and operation of AV 130, AV 130 can utilize one or more trajectory planning models, including trajectory GPT model 142, for generation of sets of candidate trajectories that downstream systems of the AV may select from for purposes of implementing on-road navigation behavior of the AV 130. As previously noted, trajectory generation models are naturally generative models, having the goal to generate as many valid, feasible trajectories as possible. The trajectory generation model aims to model the joint distribution of the observable variables and target variables. Continued development of trajectory generation models aim to simplify the architecture of the trajectory generation models, reduce latency of the trajectory generation models, reduce model size of the trajectory generation models, and provide for less model tuning parameters and steps.

In some embodiments, a trajectory GPT model 142 is provided, which is a GPT-based model. GPT models are a type of LLM and provide a framework for generative AI. GPT-style models fit well in the trajectory generation space, as the state of the AV can be modeled as language tokens, and a generated trajectory can be seen as a generated sequence of words. In embodiments herein, the GPT-based trajectory generation model, shown as trajectory GPT model 142, is described for generating trajectories for AVs. The trajectory GPT model 142 can operate by receiving input data, such as past histories, map states, other map elements, and outputting a set of AV trajectory predictions. The trajectory GPT model 142 is designed to utilize input representation(s) with vector maps, utilize vectorized intent features, and implement an encoder model with a transformer. In some embodiments, the transformer of the trajectory GPT model 142 may be implemented as an early fusion transformer providing the encoder functionality for the GPT. In this case, a decoder of the trajectory GPT model 142 may be a traditional non-transformer based decoder, such as a one-shot decoder, for example. In some embodiments, the trajectory GPT model 142 may implement an encoder-decoder transformer providing both the encoding and decoding functionality of the trajectory GPT model 142. In some embodiments, the encoder-decoder transformer can output a sequence of trajectories in an autoregressive model.

In one embodiment, the model evaluation and training component 122 can include a trajectory GPT model fine-tuning component 125 that operates to train and fine-tune the trajectory GPT model 142, which is then deployed by model deployer 124 to the planning stack 140 of AV 130. Embodiments herein provide for the trajectory GPT model fine-tuning component 125 to utilize generative AI to pre-train and fine-tune the trajectory GPT model 142. In one embodiment, the trajectory GPT model 142 can be considered a "student" model that can be pre-trained and/or fine-tuned using a teacher generative AI model. In some embodiments, the teacher generative AI model is referred to as a first generative AI model, and the student generative AI model is referred to as a second generative AI model. A separate "teacher" generative AI model (not shown) can be pre-trained (prior to and/or separate from the trajectory GPT model 142) using a higher volume of data than a smaller data set used to train the student trajectory GPT model 142. In some embodiments, the student and teacher models may share a same input format and similar model architecture, but be trained using different size data sets. Some portions of the architecture of the student model may differ from the teacher model in order to enable a smaller model size of the student model for deployment on a resource-constrained environment, such as an AV, for example. Further details of the facilitating generative AI to pre-train and fine-tune model for multiple AV trajectories generation of embodiments herein are provided below with respect to FIGS. 2-8.

Figure 2A:
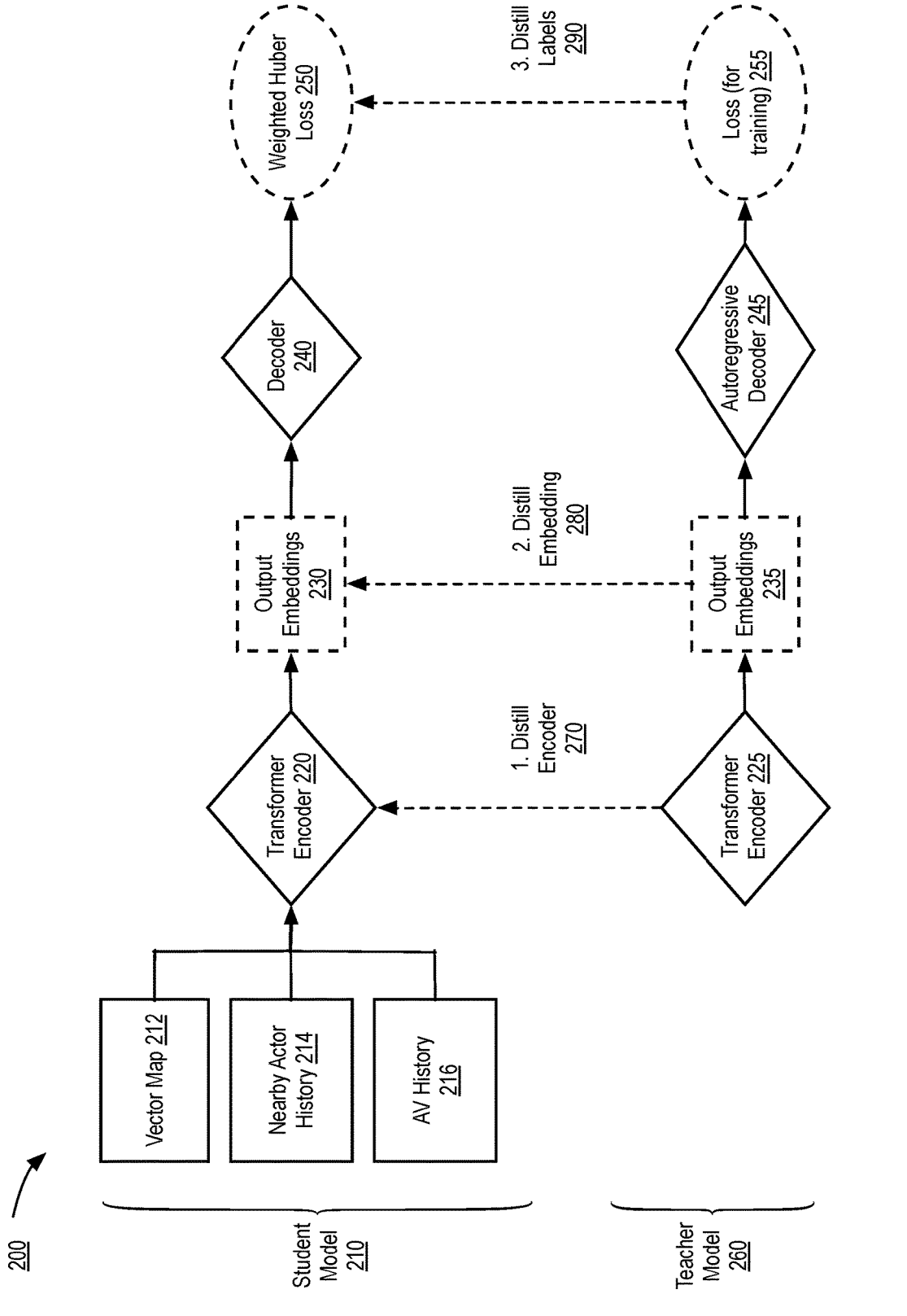
FIG. 2A is a block diagram of a trajectory generative pre-trained transformer (GPT) model fine-tuning component implementing pre-training and fine-tuning of a GPT-based trajectory generation model for autonomous systems, in accordance with embodiments herein.

FIG. 2A is a block diagram of a trajectory GPT model fine-tuning component 200 implementing pre-training and fine-tuning of a GPT-based trajectory generation model for autonomous systems, in accordance with embodiments herein. In one embodiment, trajectory GPT model fine-tuning component 200 is the same as trajectory GPT model fine-tuning component 125 described with respect to FIG. 1. Trajectory GPT model fine-tuning component 200 may include hardware circuitry, firmware, and/or software circuitry to enable and support generative AI for pre-training and fine-tuning of a GPT-based trajectory generation model as described herein.

As illustrated, an example trajectory GPT model fine-tuning component 200 may include a student model 210 and a teacher model 260. In embodiments herein, trajectory GPT model fine-tuning component 200 may be responsible for training and evaluation of the student model 210. In embodiments herein, the trajectory GPT model fine-tuning component 200 may utilize generative AI to pre-train and fine-tune the student model 210 by through bootstrapping of different pre-trained aspects of the teacher model 260. Fine-tuning or bootstrapping with pretrained models (teacher models such as teach model 260) that have access to more training data than a student model is an efficient way to transfer learning of the larger teacher model 260 to a student model 210 that is trained on smaller data with perhaps a simpler model architecture than the teacher model 260.

In one embodiment, student model 210 may be a GPT-based trajectory generation model, such as trajectory GPT model 142 described with respect to FIG. 1. The student model 210 may take inputs such as map states (e.g., including goal/route for the AV) and map elements (e.g., lane features, intersection features, traffic lights, signs, etc.) in a vector map 212 format. The student model 210 can also take inputs such as past histories (e.g., up to T seconds of), including nearby actor history 214 and/or AV history 216, in for example an (x, y) vector format. Nearby actor history may include history of road agents other than the AV that are found in scene data collected by the AV. Such road agents can include, for example, other vehicles, trains, bikes, scooters, pedestrians, animals, and so on. In embodiments herein, the input data is provided in a vectorized format that fits well with transformer-based ML architectures.

In one embodiment, the received input data 212-216 is provided to one or more neural networks for classification and/or segmentation. The neural networks can output a set of tokens corresponding to the classified data of the inputs. A token may be an instance of a sequence of elements/components (individual units) extracted from the larger dataset. In one embodiment, map tokens may be extracted from the vector map 212 input data, while agent tokens may be extracted from the nearby actor history 214 and AV history 216 input data. These tokens may be concatenated (e.g., combined) into a group of concatenated tokens that is passed to transformer encoder 220. Transformer encoder 220 is a transformer-based encoder. In embodiments herein, the transformer encoder 220 may be the backbone layers of the GPT-based trajectory generation model that can process the concatenated tokens using attention layers and MLP layers (e.g., feed forward layers) in order to generate output embeddings 230. Output embeddings 230 may refer to scene embeddings that are generated representations of a scene of the AV for the purposes of rendering views of the scene.

Figure 3A:
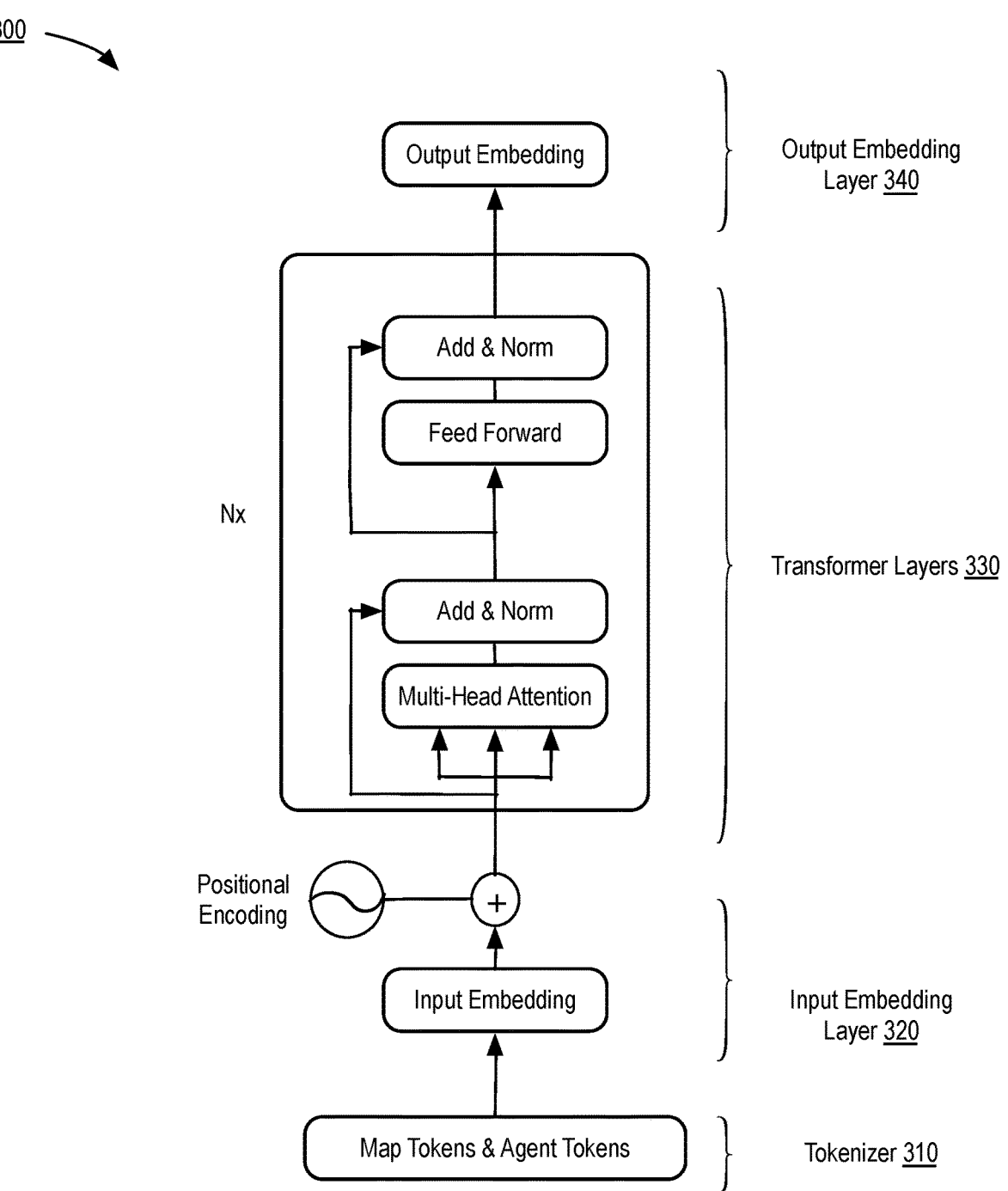
FIG. 3A is a schematic illustrating an example early fusion transformer implementing an encoder for a GPT-based trajectory generation model, in accordance with embodiments herein.

In one embodiment, the transformer encoder 220 may be an early fusion transformer. In this case, the early fusion transformer of transformer encoder 220 can be combined with a traditional decoder 240 architecture (e.g., non-transformer based decoder, such as a one-shot decoder) of the student model. FIG. 3A discussed below provides further details of the early fusion transformer embodiment.

FIG. 3A is a schematic illustrating an example early fusion transformer 300 implementing an encoder for a GPT-based trajectory generation model, in accordance with embodiments herein. In one embodiment, early fusion transformer 300 is the same as transformer encoder 220 of FIG. 2. Early fusion transformer 300 can include tokenizer layers 310, embedding layers, including input embedding layer 320 and output embedding layer 340, and transformer layers 330. Tokenizer layers 310 can convert input data into tokens, such as the map tokens and agent tokens discussed above. The map and agent tokens may be converted into semantically meaningful representations of the input by input embedding layer 320. Input embedding layer 320 may also apply positional encoding to the input embedding. Transformer layers 330 may include 'N' level(s) of layers that carry out the reasoning capabilities of the GPT-based trajectory generation model. Transformer layers 330 can include multi-headed attention layers and MLP layers such as feed forward layers. The transformer layers 330 can encode map and agent information of the input embedding, through self-attention. The transformer layers then output an output embedding at output embedding layer 340.

Referring back to FIG. 2A, the output embedding 230 can be provided to decoder 240. In one embodiment, when the transformer encoder 220 is implemented as an early fusion transformer, such as that described with respect to FIG. 3A, the decoder 240 may operate to process the output embedding 230 in order to predict a trajectory of the AV and compare the prediction to a ground truth label.

During training of the student model 210, the decoder 240 can calculate the difference between the prediction and ground truth as a weighted loss 250 and backpropagate this weighted loss 250 into the student model 210 in order to fix the error. In one embodiment, the weighted loss 250 is a weighted Huber loss.

In addition, as mentioned above, the trajectory GPT model fine-tuning component 200 may utilize a pre-trained teacher model 260 to transfer learning to the student model 210 as part of training of the student model 210. The teacher model 260 may be a generative AI model having a larger model size and trained on a larger data set, as compared to the student model 210.

In one embodiment, the teacher model 260 may include an encoder-decoder transformer architecture including transformer encoder 225 and autoregressive decoder 245. Similar to student model 210, the transformer encoder 225 can generate output embeddings 235 that are processed by autoregressive decoder 245 to generate predictions that are utilized to train the teacher model via a loss 255, such as a weighted Huber loss. In some embodiments, the teacher model can be trained using other types of loss 255, such as cross-entropy loss. The encoder-decoder transformer architecture of teacher model 260 is discussed below in further detail in FIG. 3B.

Figure 2B:
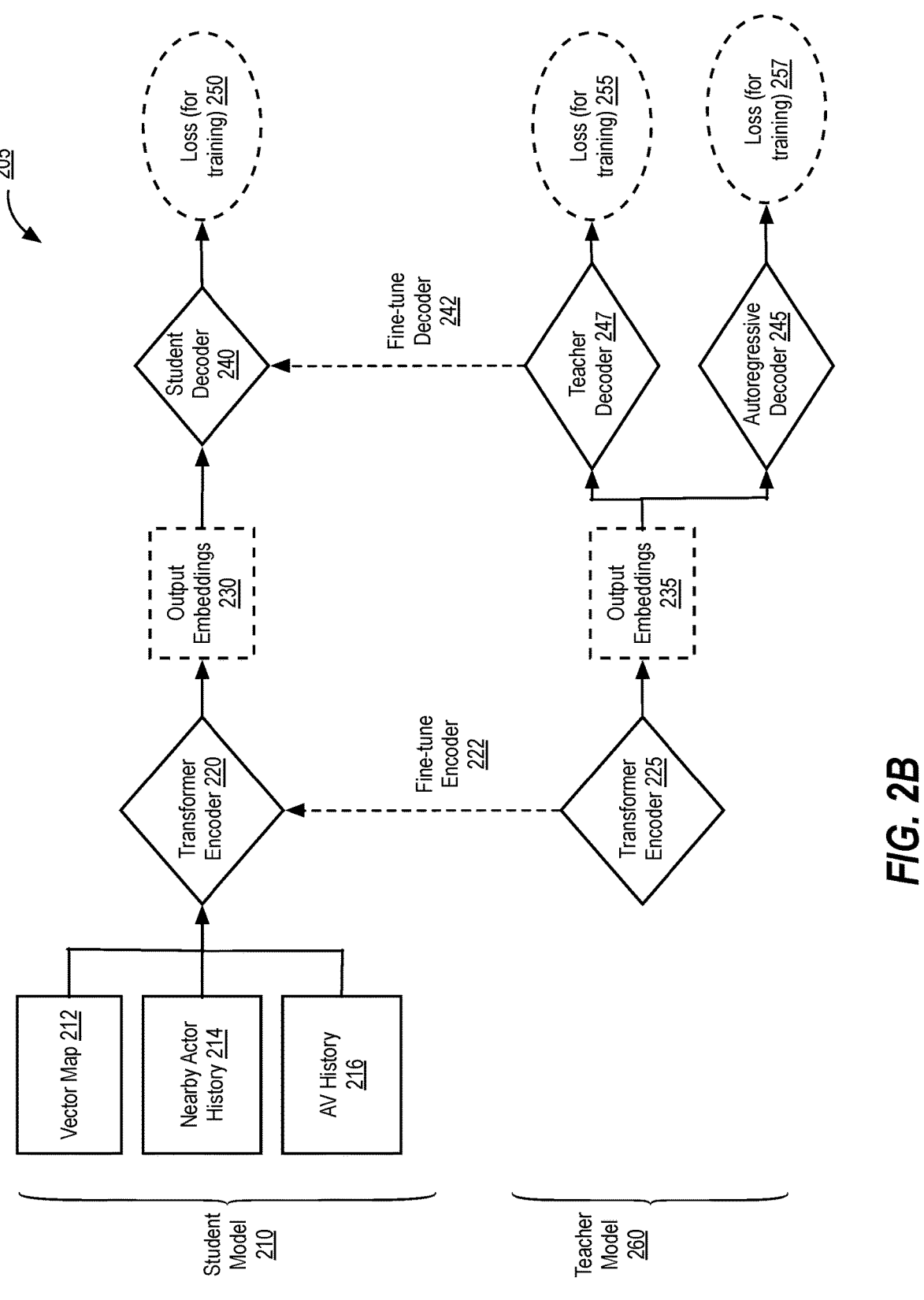
FIG. 2B is a block diagram of a trajectory GPT model fine-tuning component implementing pre-training and fine-tuning of encoder and decoder weights of a teacher model for training of a student model, in accordance with embodiments herein.
Figure 3B:
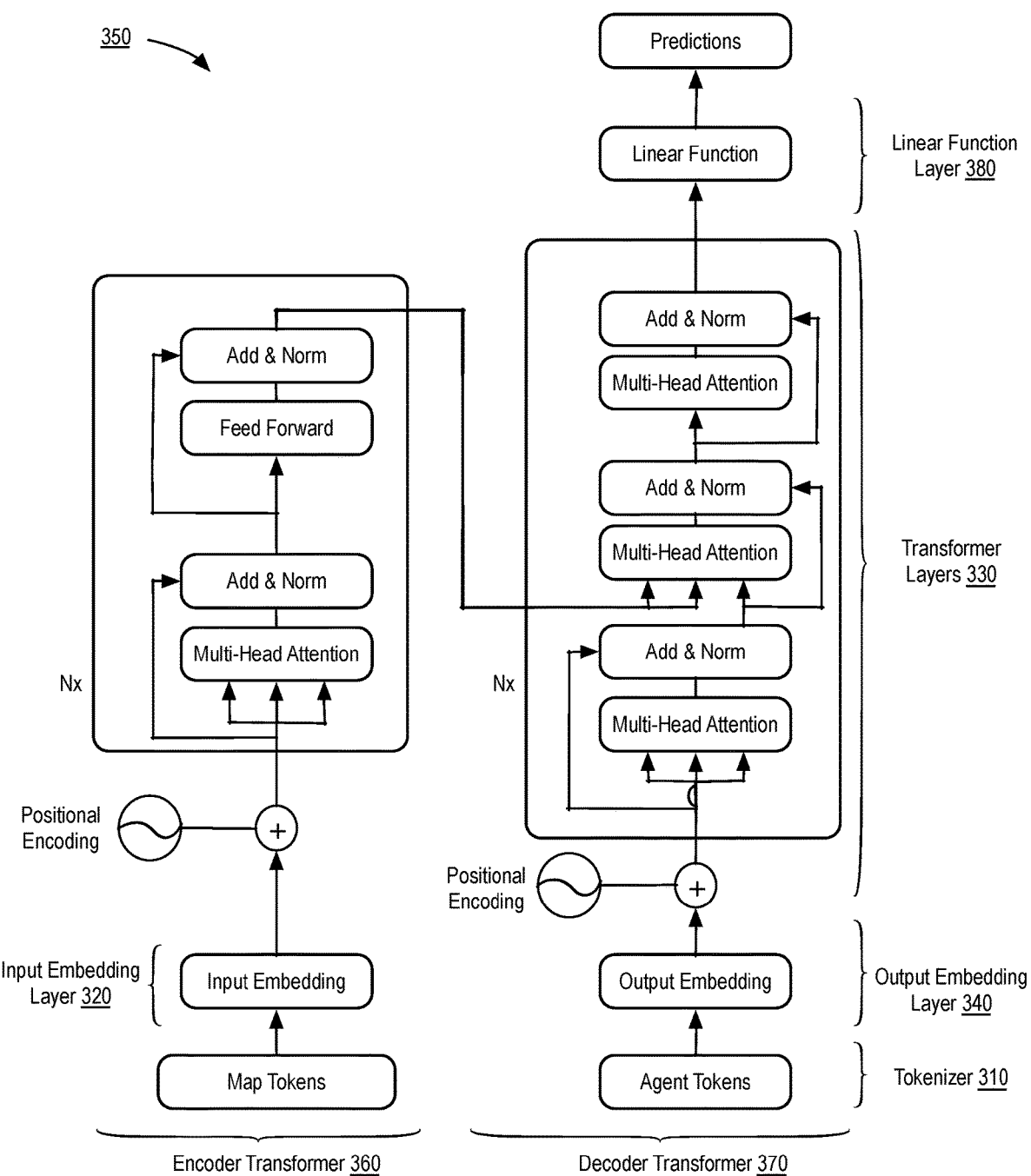
FIG. 3B is a schematic illustrating an example encoder-decoder transformer implementing an encoder transformer and a decoder transformer for a GPT-based trajectory generation model, in accordance with embodiments herein.

FIG. 3B is a schematic illustrating an example encoder-decoder transformer 350 implementing an encoder transformer 360 and a decoder transformer 370 for an example teacher model, in accordance with embodiments herein. In one embodiment, the example teacher model may be a GPT-based trajectory generation model. In other embodiments, the example teacher model may be a large GPT model utilized for autonomous driving. In one embodiment, encoder-decoder transformer 350 includes an encoder transformer 360 that is the same as transformer encoder 225 of FIG. 2, and a decoder transformer 370 that is the same as autoregressive decoder 245 of FIG. 2.

Encoder transformer 360 can include tokenizer layers 310 can convert map input data into map tokens. The map tokens may be converted into semantically meaningful representations (shown as input embedding) of the map input data by input embedding layer 320. Input embedding layer 320 may also apply positional encoding to the input embedding. Encoder transformer 360 also includes transformer layers 330 may include 'N' level(s) of layers that carry out the reasoning capabilities of the teacher model. Transformer layers 330 can include multi-headed attention layers and MLP layers such as feed forward layers. The transformer layers 330 can encode map information of the input embedding, through self-attention.

The decoder transformer 370 can include tokenizer layers 310 can convert agent input data into agent tokens. The agent tokens may be converted into semantically meaningful representations (shown as output embedding) of the agent input data by output embedding layer 340. Output embedding layer 340 may also apply positional encoding to the output embedding. Decoder transformer 370 also includes transformer layers 330 may include 'N' level(s) of layers that carry out the reasoning capabilities of the teacher model. Transformer layers 330 can include multi-headed attention layers and MLP layers such as feed forward layers. The transformer layers 330 can run masked self-attention over agent tokens over time, and cross-attention between encoded agent tokens and encoded map states.

The decoder transformer 370 outputs are run through a linear function at linear function layer 380 and a sequence of AV predictions (waypoint predictions) can be generated using an autoregressive model. An autoregressive model assumes that the observations at previous time steps are useful to predict the value at the next time step. As such, an autoregressive model may generate a prediction of future values based on past values. For example, the AV prediction at time T+1 is based on the AV prediction at time T, the AV prediction at time T+2 is based on the AV prediction at time T+1, the AV prediction at time T+3 is based on the AV prediction at time T+2, and so on. Referring back to FIG. 2A, the output generated by an encoder-decoder transformer, such as the encoder-decoder transformer of FIG. 3B, is used to calculate the loss 255 used for training of the GPT-based trajectory generation model.

Referring back to FIG. 2A, the trajectory GPT model fine-tuning component 200 may pre-train the teacher model 260 and transfer learning from the pre-trained teacher model 260 to the student model 210 for use in training of the student model 210. In embodiments herein, the different trained attributes or characteristics of the teacher model 260 may be used to fine-tune the student model 210. For example, options for distillation (e.g., adapting, fine-tuning) of the pre-trained teacher model 260 include distilling the encoder 270, distilling embeddings 280, and/or distilling labels 290. In some embodiments, these options may be applied individually and/or in combination with one another.

With respect to distilling the encoder 270, pre-trained weights from the teacher transformer encoder 225 (also referred to herein as the teacher transformer encoder 225) can be provided (e.g., distilled, adapted, fine-tuned, copied) to transformer encoder 220 (referred to herein a student transformer encoder 220). The pre-trained weights from the teacher transformer encoder 225 can be utilized as the initial weights for the student transformer encoder 220 when training begins on the student model 210. In some embodiments, pre-trained weights from the decoder of the teacher model 260 may also be used for fine-tuning of the student model 210. FIG. 2B discussed below provides further details of the distilling decoder weights embodiment.

FIG. 2B is a block diagram of a trajectory GPT model fine-tuning component 205 implementing pre-training and fine-tuning of encoder and decoder weights of a teacher model for training of a student model, in accordance with embodiments herein. In one embodiment, trajectory GPT model fine-tuning component 205 is the same as trajectory GPT model fine-tuning component 200 of FIG. 2A, and the description of similarly named and titled components of FIG. 2A also are relevant and applicable to the description of FIG. 2B. In one embodiment, decoder 240 of FIG. 2A is referred to as student decoder 240 of FIG. 2B.

As shown in FIG. 2B, the decoder architecture of teacher model 260 may include both an autoregressive decoder 245, as well as a teacher decoder 247 as an auxiliary task. In embodiments herein, when distilling weights between student model 210 and teacher model 260, the architecture of the teacher decoder 247 should be the same as the architecture of the student decoder 240 implemented in student model 210. The architectures of decoders 240, 247 may be one-shot decoders, smaller autoregressive decoders, and so on, for example. The pre-training of teacher model 260 includes simultaneous training of both the autoregressive decoder 245 and the teacher decoder 247 using loss 255 and loss 257, respectively. In some embodiments, the losses 255, 257 may be weighted Huber losses, cross-entropy losses, smooth L1 losses, and so on, to name a few examples. In embodiments herein, the encoder weights of teacher transformer encoder 225 can be distilled 222 to student transformer decoder 220 and the decoder weights of teacher decoder 247 can be distilled 242 to student decoder 240 of the student model 210.

In embodiments herein, distilling the encoder and/or decoder architecture of the teacher model 260 to the student model 210 allows for reduced convergence time for the student model which leads to improved performance of the student model.

Referring back to FIG. 2A, with respect to distilling the embeddings 280, the output embeddings 235 generated by the teacher model 260, once trained, can be provided as target output embeddings for the student model 210 to learn as part of generating the student output embeddings 230. For example, providing the teacher output embeddings 235 can encourage the student model 210 to learn an output embedding 230 that matches with the target output embedding from the teach model 260. Distilling the embeddings 280 of the teacher model 260 allows for the student model 210 to implement an arbitrary model architecture, such as an encoder architecture, that may be different from the model architecture of the teacher model 260.

With respect to distilling the labels 290, the target predictions generated by the teacher model 260, once trained, can be provided as additional labels that can be used for supervision of the student model 210 during its training. This output allows for leveraging of additional training targets generated by the teacher model 260 that can support multi-target training of the student model 210. For example, this can provide for more diverse behaviors of the trajectory predictions generated by the student model 210. Distilling the labels 290 of the teacher model 260 also allows for the student model 210 to implement an arbitrary model architecture that may be different from the model architecture of the teacher model 260.

In embodiments herein, once the student model 210 is trained and/or evaluated using the pre-trained and fine-tuned distillations from the teacher model 260 as discussed above, it can be deployed to an AV as a trajectory generation model used to generate multiple candidate trajectories for planning purposes.

FIG. 4 illustrates an example method 400 for generative AI to pre-train and fine-tune models for multiple AV trajectories generation, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where a teacher generative AI model is trained on a first set of training data having a dataset input format. Then, at block 420, a student generative AI model is provided with at least one distillation of the teacher generative AI model. In one embodiment, the at least one distillation includes transformer weights, embeddings, or prediction labels of the teacher generative AI model. In one embodiment, the student generative AI model is configured with the dataset input format of the teacher generative AI model. In some embodiments, the student generative AI model can be configured with a same transformer encoder architecture of the teacher generative AI model (e.g., when distilling weights between the student and teacher models).

Subsequently, at block 430, the student generative AI model that is initialized with the distillation of the teacher generative AI mode is trained. In one embodiment, the student generative AI model is trained using a second set of training data having the dataset input format, where the second set of training data is smaller than the first set of training data. Lastly, at block 440, the student generative AI model is deployed to a resource-constrained environment. In one embodiment, the resource-constrained environment is an AV.

FIG. 5A illustrates an example method 500 implementing distilling transformer weights as part of utilizing generative AI to pre-train and fine-tune models for multiple AV trajectories generation, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where a teacher generative AI model is trained on a first set of training data. In one embodiment, the training is performed to determine weights for a transformer encoder and decoders of the teacher generative AI model. The decoders of the teacher generative AI model may include an autoregressive decoder and a teacher decoder. Then, at block 515, the weights of the transformer encoder are provided to the student generative AI model as initial transformer encoder weights for the student generative AI model. In one embodiment, the student generative AI model includes a transformer encoder having the same architecture as the transformer encoder of the teacher generative AI model.

Subsequently, at block 520, the weights of the teacher decoder are provided to the student generative AI model as initial decoder weights for the student decoder of the student generative AI model. In one embodiment, the student generative AI model includes the student decoder which comprises the same architecture as the teacher decoder of the teacher generative AI model. Lastly, at block 525, the student generative AI model is trained on a second set of training data and is trained using the initial transformer encoder weights and the initial decoder weights.

FIG. 5B illustrates an example method 530 implementing distilling embeddings as part of utilizing generative AI to pre-train and fine-tune models for multiple AV trajectories generation, in accordance with embodiments herein. Although the example method 530 depicts a particular sequence of operations, the sequence may be altered without departing from the scope of the disclosure. For example, some of the operations depicted may be performed in parallel or in a different sequence that does not materially affect the function of the method 530. In other examples, different components of an example device or system that implements the method 530 may perform functions at substantially the same time or in a specific sequence.

According to some embodiments, the method 530 includes block 540 a teacher generative AI model is trained on a first set of training data. In one embodiment, the training of the teacher generative AI model is to generate a target output embedding from a teacher transformer encoder of the teacher generative AI model. Then, at block 545, the target output embedding is provided to a student generative AI model.

Subsequently, at block 550, the student generative AI model is trained using a second set of training data. In one embodiment, the student generative AI model includes a student transformer encoder. Lastly, at block 555, the student transformer encoder is trained to mesh an output embedding generated by the student transformer encoder to the target output embedding.

FIG. 5C illustrates an example method 560 implementing distilling labels as part of utilizing generative AI to pre-train and fine-tune models for multiple AV trajectories generation, in accordance with embodiments herein. Although the example method 560 depicts a particular sequence of operations, the sequence may be altered without departing from the scope of the disclosure. For example, some of the operations depicted may be performed in parallel or in a different sequence that does not materially affect the function of the method 560. In other examples, different components of an example device or system that implements the method 560 may perform functions at substantially the same time or in a specific sequence.

According to some embodiments, the method 560 includes block 570 where a teacher generative AI model is trained on a first set of training data. In one embodiment, the training of the teacher generative AI model is to generate a target predictions generated by the teacher generative AI model. Then, at block 575, the target predictions are provided to a student generative AI model.

Subsequently, at block 580, the student generative AI model is trained using a second set of training data. Lastly, at block 585, as part of training the student generative AI model, the target predictions are utilized as additional labels for supervision of the student generative AI model.

Figure 6:
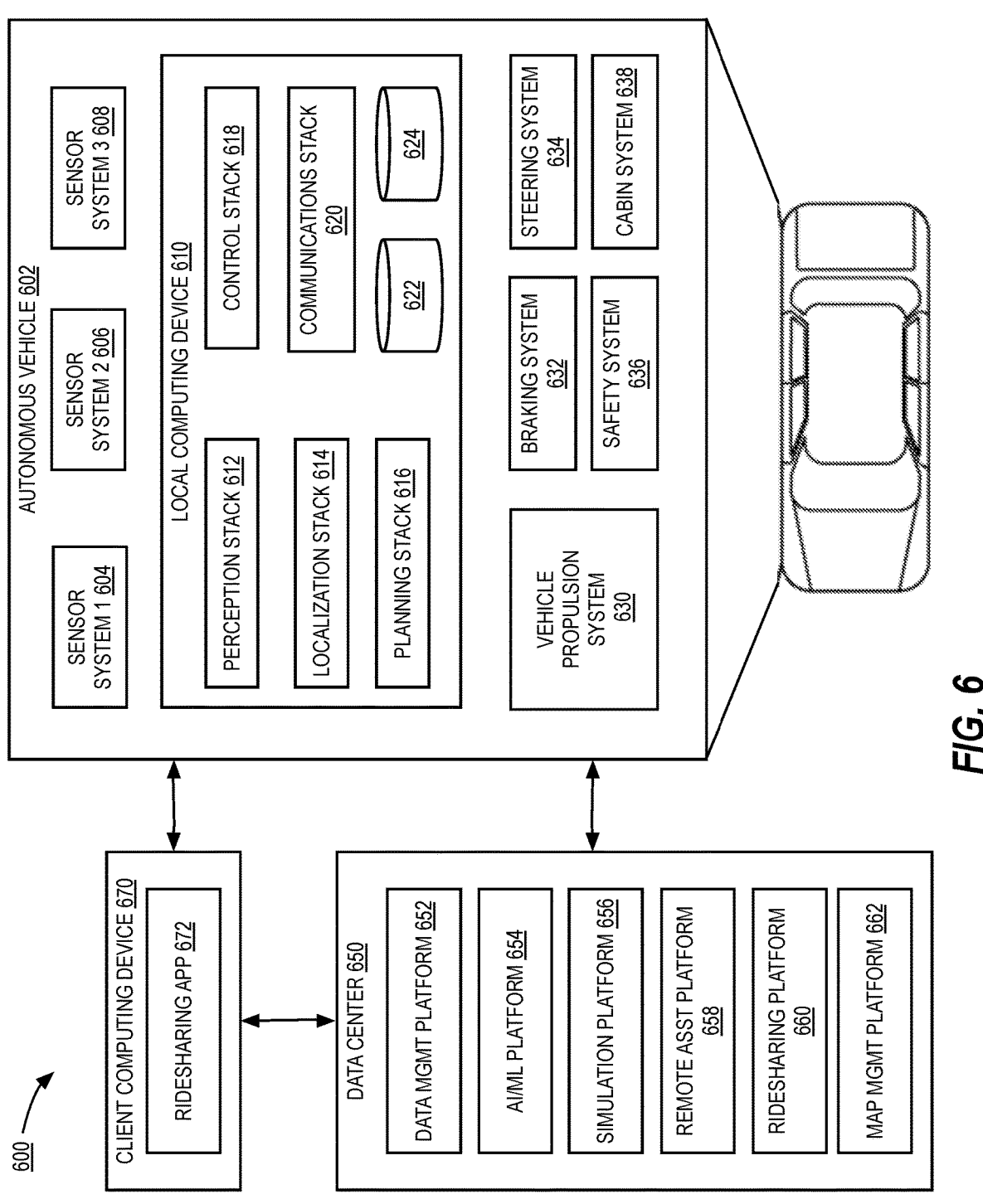
FIG. 6 illustrates an example system environment that can be used to facilitate AV dispatch and operations, according to some aspects of the disclosed technology.

Turning now to FIG. 6, this figure illustrates an example of an AV management system 600. In one embodiment, the AV management system 600 can implement generative AI to pre-train and fine-tune models for multiple AV trajectories generation, as described further herein. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-car, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
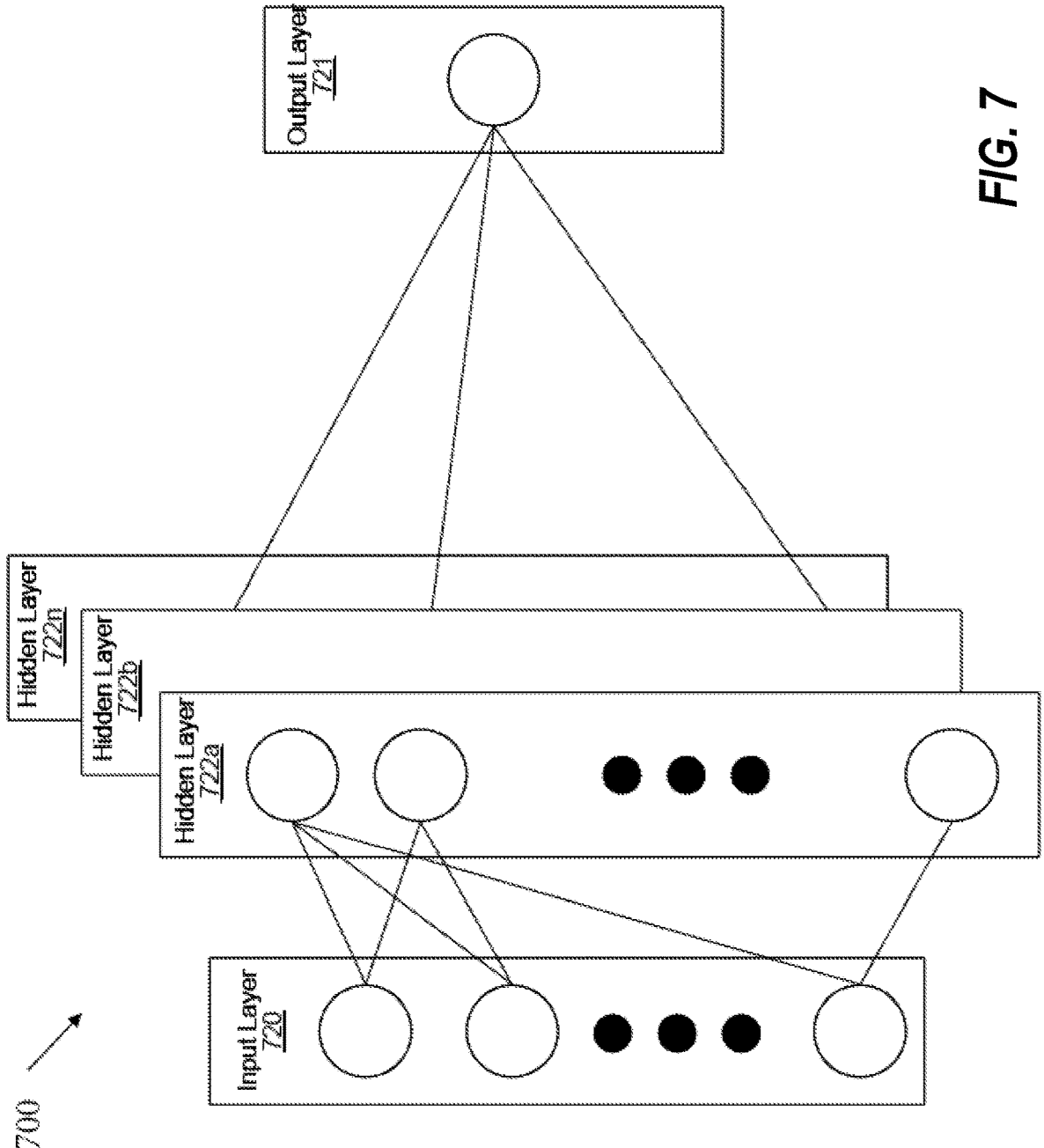
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722*a*, 722*b*, through 722*n*. The hidden layers 722*a*, 722*b*, through 722*n* include "n" number of hidden layers, where "n" is an integer greater than or equal to one. The number of hidden layers can be made to include many layers for the given application. The neural network 700 further includes an output layer 721 that provides an output resulting from the processing performed by the hidden layers 722*a*, 722*b*, through 722*n*. In one illustrative example, the output layer 721 can provide estimated treatment parameters that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722*a*. For example, as shown, each of the input nodes of the input layer 720 is connected to each of the nodes of the first hidden layer 722*a*. The nodes of the first hidden layer 722*a* can transform the information of each input node by applying activation functions to the input node information. The information derived from the transformation can then be passed to and can activate the nodes of the next hidden layer 722*b*, which can perform their own designated functions. Example functions include convolutional, up-sampling, data transformation, and/or any other suitable functions. The output of the hidden layer 722*b* can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $$E\_total = \sum\left(\frac{1}{2}(target - output)^2\right).$$

The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
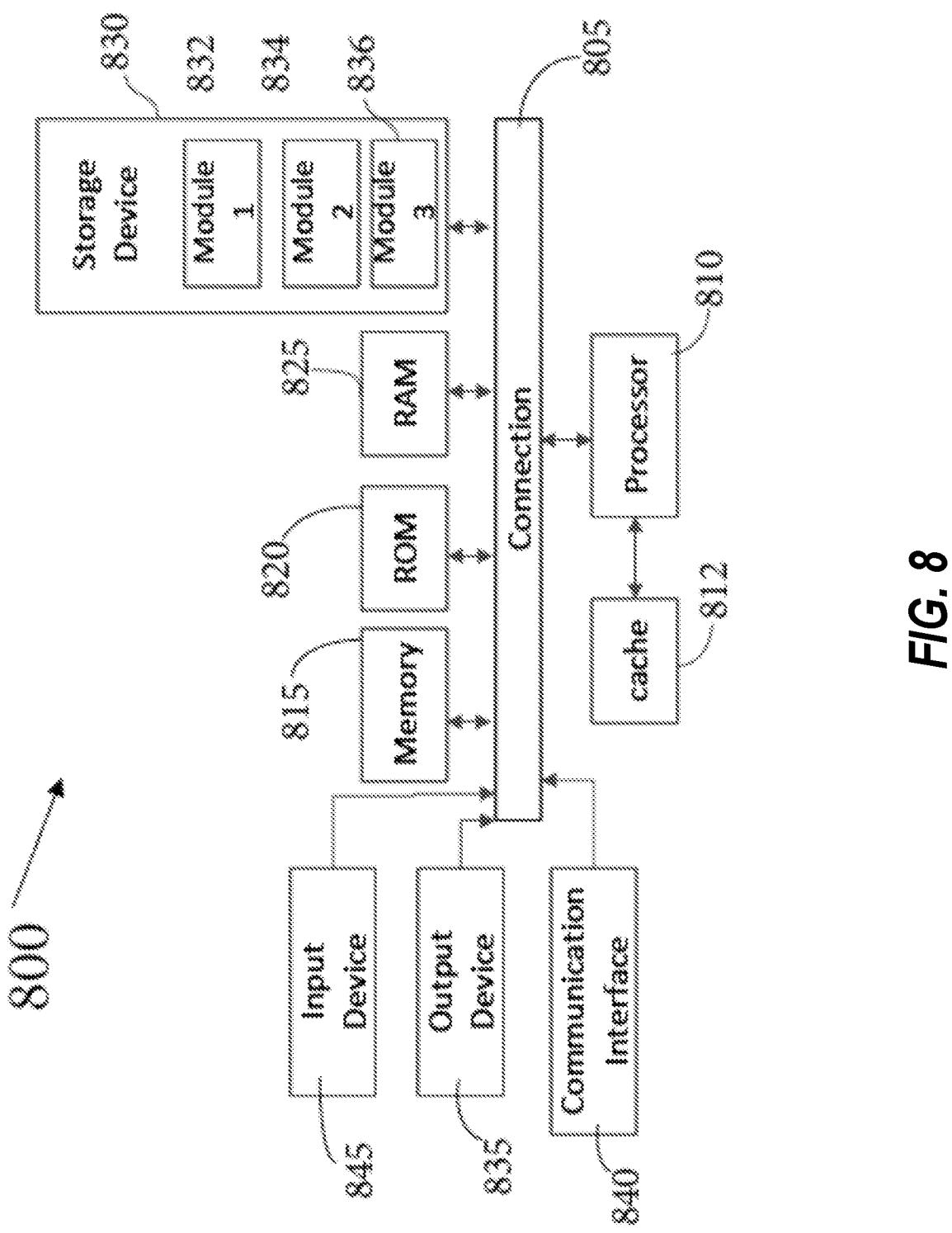
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a computer-implemented method for facilitating generative AI to pre-train and fine-tune models for multiple AV trajectories generation, where the method comprises: training, by a processing device, a teacher generative artificial intelligence (AI) model on a first set of training data; providing a student generative AI model with at least one distillation of the teacher generative AI model, the at least one distillation comprising transformer weights, embeddings, or predictions labels of the teacher generative AI model; training the student generative AI model that is initialized with the at least one distillation of the teacher generative AI model, wherein the student generative AI model is trained using a second set of training data that is smaller than the first set of training data; and deploying the student generative AI model to a resource-constrained environment.

In Example 2, the subject matter of Example 1 can optionally include wherein the student generative AI model comprises a transformer encoder architecture that is the same as the teacher generative AI model, and wherein the second set of training data having a same dataset input format as the first set of training data for the teacher generative AI model. In Example 3, the subject matter of any one of Examples 1-2 can optionally include wherein the transformer encoder architecture comprises an early fusion transformer.

In Example 4, the subject matter of any one of Examples 1-3 can optionally include wherein the student generative AI model comprises a generative pre-trained transformer (GPT)-based trajectory generation model for generative a set of autonomous vehicle (AV) waypoint predictions, and wherein the resource-constrained environment for deployment comprises an AV. In Example 5, the subject matter of any one of Examples 1-4 can optionally include wherein the teacher generative AI model comprises an encoder-decoder transformer comprising a transformer encoder and an autoregressive transformer decoder, and further comprises a one-shot decoder, wherein the autoregressive transformer decoder outputs a sequence of predictions using an autoregressive model.

In Example 6, the subject matter of any one of Examples 1-5 can optionally include wherein providing the student generative AI model with the at least one distillation further comprises: providing the transformer weights of the teacher generative AI model to the student generative AI model by: providing first weights of the transformer encoder as initial transformer encoder weights to a student transformer encoder of the student generative AI model; and providing second weights of the one-shot decoder as initial decoder weights to a student decoder of the student generative AI model; and training the student generative AI model using the initial transformer encoder weights and the initial decoder weights.

In Example 7, the subject matter of any one of Examples 1-6 can optionally include wherein providing the student generative AI model with the at least one distillation further comprises: providing a target output embedding generated by a teacher transformer encoder of the teacher generative AI model to the student generative AI model; and training a student transformer encoder of the student generative AI model to mesh an output embedding generated by the student transformer encoder to the target output embedding. In Example 8, the subject matter of any one of Examples 1-7 can optionally include wherein providing the student generative AI model with the at least one distillation further comprises: providing target predictions generated by the teacher generative AI model to the student generative AI model; and training the student generative AI model using the target predictions as additional labels for supervision of the student generative AI model.

Example 9 includes an apparatus for facilitating generative AI to pre-train and fine-tune models for multiple AV trajectories generation, the apparatus of Example 9 comprising one or more hardware processors to: train a first generative artificial intelligence (AI) model on a first set of training data; provide a second generative AI model with at least one distillation of the first generative AI model, the at least one distillation comprising transformer weights, embeddings, or predictions labels of the first generative AI model; train the second generative AI model that is initialized with the at least one distillation of the first generative AI model, wherein the second generative AI model is trained using a second set of training data that is smaller than the first set of training data; and deploy the second generative AI model to a resource-constrained environment.

In Example 10, the subject matter of Example 9 can optionally include wherein the second generative AI model comprises a generative pre-trained transformer (GPT)-based trajectory generation model for generative a set of autonomous vehicle (AV) waypoint predictions, and wherein the resource-constrained environment for deployment comprises an AV. In Example 11, the subject matter of Examples 9-10 can optionally include wherein the first generative AI model comprises an encoder-decoder transformer comprising a first transformer encoder and an autoregressive transformer decoder, and further comprises a one-shot decoder, wherein the autoregressive transformer decoder outputs a sequence of predictions using an autoregressive model.

In Example 12, the subject matter of Examples 9-11 can optionally include wherein the one or more hardware processors to provide the second generative AI model with the at least one distillation further comprises the one or more hardware processors to: provide the transformer weights of the first generative AI model to the second generative AI model by: providing first weights of the first transformer encoder as initial transformer encoder weights to a second transformer encoder of the second generative AI model; and providing second weights of the one-shot decoder as initial decoder weights to a second decoder of the second generative AI model; and train the second generative AI model using the initial transformer encoder weights and the initial decoder weights In Example 13, the subject matter of Examples 9-12 can optionally include wherein the one or more hardware processors to provide the second generative AI model with the at least one distillation further comprises the one or more hardware processors to: provide a target output embedding generated by a first transformer encoder of the first generative AI model to the second generative AI model; and train a second transformer encoder of the second generative AI model to mesh an output embedding generated by a second transformer encoder of the second generative AI model to the target output embedding.

In Example 14, the subject matter of Examples 9-13 can optionally include wherein the one or more hardware processors to provide the second generative AI model with the at least one distillation further comprises the one or more hardware processors to: provide target predictions generated by the first generative AI model to the second generative AI model; and train the second generative AI model using the target predictions as additional labels for supervision of the second generative AI model.

Example 15 is a non-transitory computer-readable storage medium for facilitating generative AI to pre-train and fine-tune models for multiple AV trajectories generation. The non-transitory computer-readable storage medium of Example 15 having stored thereon executable computer program instructions that, when executed by one or more processors, cause the one or more processors to: train a teacher generative artificial intelligence (AI) model on a first set of training data; provide a student generative AI model with at least one distillation of the teacher generative AI model, the at least one distillation comprising transformer weights, embeddings, or predictions labels of the teacher generative AI model; train the student generative AI model that is initialized with the at least one distillation of the teacher generative AI model, wherein the student generative AI model is trained using a second set of training data that is smaller than the first set of training data; and deploy the student generative AI model to a resource-constrained environment.

In Example 16, the subject matter of Example 15 can optionally include wherein the student generative AI model comprises a generative pre-trained transformer (GPT)-based trajectory generation model for generative a set of autonomous vehicle (AV) waypoint predictions, and wherein the resource-constrained environment for deployment comprises an AV. In Example 17, the subject matter of Examples 15-16 can optionally include wherein the teacher generative AI model comprises an encoder-decoder transformer comprising a transformer encoder and an autoregressive transformer decoder, and further comprises a one-shot decoder, wherein the autoregressive transformer decoder outputs a sequence of predictions using an autoregressive model.

In Example 18, the subject matter of Examples 15-17 can optionally include wherein the one or more hardware processors to provide the student generative AI model with the at least one distillation further comprises the one or more hardware processors to: provide the transformer weights of the teacher generative AI model to the student generative AI model by: providing first weights of the transformer encoder as initial transformer encoder weights to a student transformer encoder of the student generative AI model; and providing second weights of the one-shot decoder as initial decoder weights to a student decoder of the student generative AI model; and train the student generative AI model using the initial transformer encoder weights and the initial decoder weights.

In Example 19, the subject matter of Examples 15-18 can optionally include wherein the one or more hardware processors to provide the student generative AI model with the at least one distillation further comprises the one or more hardware processors to: provide a target output embedding generated by a teacher transformer encoder of the teacher generative AI model to the student generative AI model; and train a student transformer encoder of the student generative AI model to mesh an output embedding generated by the student transformer encoder to the target output embedding.

In Example 20, the subject matter of Examples 15-19 can optionally include wherein the one or more hardware processors to provide the student generative AI model with the at least one distillation further comprises the one or more hardware processors to: provide target predictions generated by the teacher generative AI model to the student generative AI model; and train the student generative AI model using the target predictions as additional labels for supervision of the student generative AI model.

Example 21 is a system for facilitating generative AI to pre-train and fine-tune models for multiple AV trajectories generation. The system of Example 21 can optionally include a memory to store a block of data, and one or more hardware processors to: train a first generative artificial intelligence (AI) model on a first set of training data; provide a second generative AI model with at least one distillation of the first generative AI model, the at least one distillation comprising transformer weights, embeddings, or predictions labels of the first generative AI model; train the second generative AI model that is initialized with the at least one distillation of the first generative AI model, wherein the second generative AI model is trained using a second set of training data that is smaller than the first set of training data; and deploy the second generative AI model to a resource-constrained environment.

In Example 22, the subject matter of Example 21 can optionally include wherein the second generative AI model comprises a generative pre-trained transformer (GPT)-based trajectory generation model for generative a set of autonomous vehicle (AV) waypoint predictions, and wherein the resource-constrained environment for deployment comprises an AV. In Example 23, the subject matter of Examples 21-22 can optionally include wherein the first generative AI model comprises an encoder-decoder transformer comprising a first transformer encoder and an autoregressive transformer decoder, and further comprises a one-shot decoder, wherein the autoregressive transformer decoder outputs a sequence of predictions using an autoregressive model.

In Example 24, the subject matter of Examples 21-23 can optionally include wherein the one or more hardware processors to provide the second generative AI model with the at least one distillation further comprises the one or more hardware processors to: provide the transformer weights of the first generative AI model to the second generative AI model by: providing first weights of the first transformer encoder as initial transformer encoder weights to a second transformer encoder of the second generative AI model; and providing second weights of the one-shot decoder as initial decoder weights to a second decoder of the second generative AI model; and train the second generative AI model using the initial transformer encoder weights and the initial decoder weights In Example 25, the subject matter of Examples 21-24 can optionally include wherein the one or more hardware processors to provide the second generative AI model with the at least one distillation further comprises the one or more hardware processors to: provide a target output embedding generated by a first transformer encoder of the first generative AI model to the second generative AI model; and train a second transformer encoder of the second generative AI model to mesh an output embedding generated by a second transformer encoder of the second generative AI model to the target output embedding.

In Example 26, the subject matter of Examples 21-25 can optionally include wherein the one or more hardware processors to provide the second generative AI model with the at least one distillation further comprises the one or more hardware processors to: provide target predictions generated by the first generative AI model to the second generative AI model; and train the second generative AI model using the target predictions as additional labels for supervision of the second generative AI model.

Example 27 includes an apparatus comprising means for performing the method of any of the Examples 1-8. Example 28 is at least one machine readable medium comprising a plurality of instructions that in response to being executed on a computing device, cause the computing device to carry out a method according to any one of Examples 1-8. Example 29 is an apparatus for facilitating generative AI to pre-train and fine-tune models for multiple AV trajectories generation, configured to perform the method of any one of Examples 1-8. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
training, by a processing device, a teacher generative artificial intelligence (AI) model on a first set of training data;
providing a student generative AI model with at least one distillation of the teacher generative AI model, the at least one distillation comprising transformer weights, embeddings, or predictions labels of the teacher generative AI model;
training the student generative AI model that is initialized with the at least one distillation of the teacher generative AI model, wherein the student generative AI model is trained using a second set of training data that is smaller than the first set of training data;
deploying the student generative AI model to an autonomous vehicle;
generating a prediction using student generative AI model; and
causing the autonomous vehicle to maneuver using the prediction from the student generative AI model,
wherein the teacher generative AI model comprises an encoder-decoder transformer comprising a transformer encoder and an autoregressive transformer decoder, and further comprises a one-shot decoder, wherein the autoregressive transformer decoder outputs a sequence of predictions using an autoregressive model, and
wherein providing the student generative AI model with the at least one distillation further comprises:
providing the transformer weights of the teacher generative AI model to the student generative AI model by:
providing first weights of the transformer encoder as initial transformer encoder weights to a student transformer encoder of the student generative AI model; and
providing second weights of the one-shot decoder as initial decoder weights to a student decoder of the student generative AI model; and
training the student generative AI model using the initial transformer encoder weights and the initial decoder weights.

2. The computer-implemented method of claim 1, wherein the student generative AI model comprises a transformer encoder architecture that is the same as the teacher generative AI model, and wherein the second set of training data has a same dataset input format as the first set of training data for the teacher generative AI model.

3. The computer-implemented method of claim 2, wherein the transformer encoder architecture comprises an early fusion transformer.

4. The computer-implemented method of claim 1, wherein the student generative AI model comprises a generative pre-trained transformer (GPT)-based trajectory generation model for generating a set of autonomous vehicle (AV) waypoint predictions.

5. The computer-implemented method of claim 1, wherein providing the student generative AI model with the at least one distillation further comprises:
providing a target output embedding generated by a teacher transformer encoder of the teacher generative AI model to the student generative AI model; and
training a student transformer encoder of the student generative AI model to mesh an output embedding generated by the student transformer encoder to the target output embedding.

6. The computer-implemented method of claim 1, wherein providing the student generative AI model with the at least one distillation further comprises:
providing target predictions generated by the teacher generative AI model to the student generative AI model; and
training the student generative AI model using the target predictions as additional labels for supervision of the student generative AI model.

7. An apparatus comprising:
one or more hardware processors to:
train a first generative artificial intelligence (AI) model on a first set of training data;
provide a second generative AI model with at least one distillation of the first generative AI model, the at least one distillation comprising transformer weights, embeddings, or predictions labels of the first generative AI model;
train the second generative AI model that is initialized with the at least one distillation of the first generative AI model, wherein the second generative AI model is trained using a second set of training data that is smaller than the first set of training data;
deploy the second generative AI model to an autonomous vehicle;
generating a prediction using student generative AI model; and
causing the autonomous vehicle to maneuver using the prediction from the student generative AI model,
wherein the first generative AI model comprises an encoder-decoder transformer comprising a first transformer encoder and an autoregressive transformer decoder, and further comprises a one-shot decoder, wherein the autoregressive transformer decoder outputs a sequence of predictions using an autoregressive model, and
wherein the one or more hardware processors to provide the second generative AI model with the at least one distillation further comprises the one or more hardware processors to:
provide the transformer weights of the first generative AI model to the second generative AI model by:
providing first weights of the first transformer encoder as initial transformer encoder weights to a second transformer encoder of the second generative AI model; and
providing second weights of the one-shot decoder as initial decoder weights to a second decoder of the second generative AI model; and
train the second generative AI model using the initial transformer encoder weights and the initial decoder weights.

8. The apparatus of claim 7, wherein the second generative AI model comprises a generative pre-trained transformer (GPT)-based trajectory generation model for generating a set of autonomous vehicle (AV) waypoint predictions, and wherein the resource-constrained environment for deployment comprises an AV.

9. The apparatus of claim 7, wherein the one or more hardware processors to provide the second generative AI model with the at least one distillation further comprises the one or more hardware processors to:

provide a target output embedding generated by a first transformer encoder of the first generative AI model to the second generative AI model; and train a second transformer encoder of the second generative AI model to mesh an output embedding generated by a second transformer encoder of the second generative AI model to the target output embedding.

10. The apparatus of claim 7, wherein the one or more hardware processors to provide the second generative AI model with the at least one distillation further comprises the one or more hardware processors to:

provide target predictions generated by the first generative AI model to the second generative AI model; and train the second generative AI model using the target predictions as additional labels for supervision of the second generative AI model.

11. A non-transitory computer-readable medium having stored thereon instructions that, when executed by one or more processors, cause the one or more processors to:

train a teacher generative artificial intelligence (AI) model on a first set of training data;

provide a student generative AI model with at least one distillation of the teacher generative AI model, the at least one distillation comprising transformer weights, embeddings, or predictions labels of the teacher generative AI model;

train the student generative AI model that is initialized with the at least one distillation of the teacher generative AI model, wherein the student generative AI model is trained using a second set of training data that is smaller than the first set of training data;

deploy the student generative AI model to an autonomous vehicle;

generate a prediction using student generative AI model; and cause the autonomous vehicle to maneuver using the prediction from the student generative AI model, wherein the teacher generative AI model comprises an encoder-decoder transformer comprising a transformer encoder and an autoregressive transformer decoder, and further comprises a one-shot decoder, wherein the autoregressive transformer decoder outputs a sequence of predictions using an autoregressive model, and wherein the one or more hardware processors to provide the student generative AI model with the at least one distillation further comprises the one or more hardware processors to:

provide the transformer weights of the teacher generative AI model to the student generative AI model by:

providing first weights of the transformer encoder as initial transformer encoder weights to a student transformer encoder of the student generative AI model; and providing second weights of the one-shot decoder as initial decoder weights to a student decoder of the student generative AI model; and train the student generative AI model using the initial transformer encoder weights and the initial decoder weights.

12. The non-transitory computer-readable medium of claim 11, wherein the student generative AI model comprises a generative pre-trained transformer (GPT)-based trajectory generation model for generating a set of autonomous vehicle (AV) waypoint predictions.

13. The non-transitory computer-readable medium of claim 11, wherein the one or more hardware processors to provide the student generative AI model with the at least one distillation further comprises the one or more hardware processors to:

provide a target output embedding generated by a teacher transformer encoder of the teacher generative AI model to the student generative AI model; and train a student transformer encoder of the student generative AI model to mesh an output embedding generated by the student transformer encoder to the target output embedding.

14. The non-transitory computer-readable medium of claim 11, wherein the one or more hardware processors to provide the student generative AI model with the at least one distillation further comprises the one or more hardware processors to:

provide target predictions generated by the teacher generative AI model to the student generative AI model; and train the student generative AI model using the target predictions as additional labels for supervision of the student generative AI model.

* * * * *